UNITED STATES PATENT OFFICE.

EDWARD L. CONWELL, OF UPLAND, PENNSYLVANIA, ASSIGNOR TO ALUMINATE PATENTS COMPANY, OF PHILADELPHIA, PENNSYLVANIA, A CORPORATION OF NEW JERSEY.

PLASTIC MATERIAL AND COMPOSITE ACCELERATING MATERIAL THEREFOR.

1,185,773.  Specification of Letters Patent.  Patented June 6, 1916.

No Drawing.   Application filed November 7, 1912. Serial No. 729,979.

*To all whom it may concern:*

Be it known that I, EDWARD L. CONWELL, a citizen of the United States, and a resident of Upland, Chester, Delaware county, Pennsylvania, have made a certain new and useful Invention Relating to Plastic Materials and Composite Accelerating Materials Therefor, of which the following is a specification.

This invention relates to plastic materials comprising lime and natural cement, that is low lime hydraulic cement commonly known as natural Rosendale or Roman cement, and also supersulfate or other available energizing material such as bisulfates or disulfates of the alkali metals.

The invention relates especially to plaster compositions of this character comprising large proportions of hydrated lime mixed with a relatively small proportion of natural cement strength accelerating material with which is ground together or otherwise mixed sodium disulfate energizing material or the like so that the plaster compositions, that is compositions used for wall plastering and the like and also in some cases useful as mortars for brick laying and so forth, are improved in working properties such as plasticity, reliability, sand-carrying and cementitious properties, especially if somewhat large proportions of the composite strength accelerating material are incorporated.

The invention also relates to such combined strength accelerating material comprising natural cement and coöperating energizing material such as sodium disulfate or the like. Suitable energizing materials of this class, that is, compounds apparently having loosely combined or otherwise available sulfuric acid or sulfuric anhydrid and which are herein referred to as supersulfates, such for example, as potassium disulfate ($K_2S_2O_7$) or its more hydrous variant potassium bisulfate ($KHSO_4$), sodium disulfate ($Na_2S_2O_7$), the related sodium bisulfate ($NaHSO_4$), ammonium bisulfate ($NH_4HSO_4$), ferric sulfate ($Fe_2(SO_4)_3$), and acid calcium sulfate, preferably in their commercial or crude forms, such as niter cake, acid calcium sulfate sludge, and so forth, seem to have desirable energizing action on natural cement strength accelerating or hardening material when incorporated therewith, so as to increase and hasten the strength accelerating and cementitious action of such material on coöperating cementitious material comprising hydrated or otherwise available lime. This seems to be due to the supersulfate energizing material acting upon and disintegrating or opening up the strength accelerating material, possibly because of its available loosely combined sulfuric anhydrid, either with or without water united therewith, thus apparently promoting the activity of certain hydraulic elements and their solubility in alkaline solutions of the material present, or rendering them more active in connection with the lime component of the coöperating cementitious material. Such supersulfate energizing material when incorporated to the extent of a few per cent. more or less, for example, with wall plaster compositions comprising about 85 parts of hydrated lime and 15 to 25 parts or so of natural cement, materially promotes the cementitious properties and hydraulic set of the plastic composition and makes the compositions more desirable for use, especially under extreme service, where for example, conditions tend to promote excessive drying out. Many such coöperating energizing materials containing similarly available loosely combined sulfuric anhydrid or sulfuric acid not only increase the cementitious properties and early strengths of the plastic compositions, but also promote their plasticity, reliability and spreading properties and their hardening and substantially uniform homogeneous setting.

It is desirable that the natural cement strength accelerating material and the sodium bisulfate or other energizing material containing available acid should be ground together or otherwise thoroughly incorporated, which seems to promote the initiation of chemical action to the extent permitted by the presence of the usual small proportion of water therein, and the opening up or disintegration of the strength accelerating material. The strength accelerating action occurring when the plaster compositions or other calcareous cementitious materials in which such prepared materials are incorporated, are gaged and tempered, is possibly increased because of the further chemical interaction of the acid and other components and the decomposition or liberation of the aluminous, silicious or other hydraulic components in such form as to more readily exert cementitious or hydraulic action in connection with the lime and so forth. Besides securing an extremely intimate and desirable incorporation of the natural cement and any suitable coöperating energizing material containing loosely combined or available sulfuric anhydrid, this method of incorporation by grinding these components together, in ball and tube mills, for instance, also produces desirable combined strength accelerating materials which may be produced and shipped in the dry finely divided condition suitable for mixture in desired proportions with hydrated lime or other coöperating calcareous cementitious material. Hydrated lime plaster compositions prepared in this way by the incorporation of ten to thirty per cent. or so of suitable natural cement strength accelerating material, and about one-thirtieth to one-sixth as much coöperating sodium disulfate or bisulfate energizing material, are quite satisfactory from the practical working standpoint, and possess to a considerable extent many of the desirable features of ordinary lump lime putty plasters including plasticity, ease of working and large sand carrying properties, besides being much more convenient to prepare for use, quicker hardening and having greater early strengths and cementitious or hydraulic properties and being more durable and resistant to weather conditions. Such supersulfate energizing material may be advantageously mixed or incorporated in any desired way, preferably by grinding or otherwise intimately mixing with any suitable natural cement and with various coöperating cementitious materials comprising free or available lime, such for example, as with hydrated lime wall plaster compositions containing large proportions of lime, in the case of hydrated lime plaster compositions the lime and strength accelerating and energizing materials may with advantage be crushed together or intimately incorporated and the compositions simultaneously densified as described at length and claimed in the application of Spackman and Lazell, Serial No. 698,906, filed May 22, 1912. For general purposes good results are secured when sufficient sodium disulfate or bisulfate is incorporated so that free or available sulfuric acid is thus provided to the extent of .3% to .5% or so of the total hydrated lime plaster composition containing 15% to 25% more or less of the natural cement strength accelerating material.

A plaster composition was made by incorporating with dolomitic hydrated lime 15% of the composite strength accelerating material comprising natural cement ground together with one-eighth as much sodium disulfate which produces a composition having good workability and spreading properties and desirable hardening and early strengths so as to be much superior to a corresponding mixture of the natural cement and lime without the incorporation of the supersulfate energizing material. This composition when one part was tested with four parts of Ottawa sand gave the following tensile strengths per square inch: at 24 hours 7 pounds, at 2 days 22 pounds, at 7 days 27 pounds, at 28 days 32 pounds, at 3 months 62 pounds, the magnesian hydrated lime, the combined strength accelerating material comprising natural cement and sodium disulfate, and the sodium disulfate energizing material used in the foregoing composition having about the following analyses:

|  | Magnesian hydrated lime. | Natural cement: Combined strength accelerating material comprising 8 parts natural cement and 1 part sodium disulfate. | Sodium disulfate. |
|---|---|---|---|
| Silica (SiO₂) | 2.04% | 26.92% | 1.5% |
| Ferric oxid and alumina (R₂O₃) | 0.04 | 10.84 | 0.2 |
| Lime (CaO) |  | 44.35 |  |
| Magnesia (MgO) | 30.86 | 2.84 |  |
| Calcium carbonate (CaCO₃) | 3.32 |  |  |
| Calcium hydrate (Ca(OH)₂) | 61.58 |  |  |
| Sodium sulfate (Na₂SO₄) |  |  | 62.8 |
| Sulfuric anhydrid (SO₃) |  | 7.40 | 30.1 |
| Mech. contained water | 0.24 |  |  |
| Water (H₂O) |  |  | 5.3 |
| Loss on ignition |  | 5.16 |  |

Another suitable plaster composition was produced by thoroughly incorporating with hydrated high calcium lime 15% of the composite strength accelerating material comprising natural cement and one-eighth as much of sodium disulfate which had been ground together with the natural cement so as to be thoroughly incorporated. This plaster composition gave when similarly tested the following tensile strengths: at 24 hours 30 pounds; at 2 days 56 pounds; at 7 days 62 pounds; at 28 days 82 pounds, this natural cement being designated No. 1 in the following table. Another suitable plaster composition which had somewhat less satisfactory hardening properties when used as a wall plaster was made by similarly incorporating with the same high calcium hydrated lime 15% of similar composite strength accelerating material formed by grinding together 1 part of sodium disulfate with 8 parts of another natural cement designated No. 2 in the following table. This plaster composition when similarly tested gave the following tensile strengths: at 24 hours 10 pounds; at 2 days 35 pounds; at 7 days 43 pounds and at 28 days 58 pounds.

| | Natural cement #1. | Natural cement #2. |
|---|---|---|
| Silica ($SiO_2$) | 20.22% | 23.68% |
| Ferric oxid and alumina ($R_2O_3$) | 8.22% | 16.96% |
| Lime (CaO) | 44.75% | 34.95% |
| Magnesia (MgO) | 10.01% | 14.90% |
| Sulfuric anhydrid ($SO_3$) | 1.95% | 1.04% |
| Loss on ignition | 13.88% | 9.60% |

It is of course understood that the strength tests given in connection with the foregoing examples must be considered in connection with the extreme difficulty of securing reliable strength tests with lime plaster compositions. These tensile tests were made on briquets formed in the regular way for cement testing, the briquets being kept in air, but in spite of all possible precautions considerable variations are likely to be found in such results and it is well understood that much more reliance must be placed on the practical working results of such plaster compositions in which way their plasticity, sand carrying qualities, workability and hardening, setting, strength and reliability can be determined in a more satisfactory way, especially since high tensile strengths are not of first importance in ordinary plastering compositions, provided the material develops at a relatively early period sufficient strength to certainly remain in position on the wall in spite of such disturbance or vibration as may be occasioned by setting the adjacent door frames or trim.

The invention has been described in connection with a number of illustrative compositions, ingredients, proportions, formulas and methods of preparation and use, to the details of which disclosure the invention is not of course to be limited, but

What is claimed as new and what is desired to be secured by Letters Patent is set forth in the appended claims.

1. The plaster composition comprising a large proportion of high calcium hydrated lime mixed with ten to thirty per cent. of natural cement which has been ground together with about five to fifteen per cent. as much sodium disulfate energizing material.

2. The plaster composition comprising a large proportion of hydrated lime mixed with natural cement which has been ground together with alkali metal supersulfate energizing material.

3. The plaster composition comprising a large proportion of hydrated lime mixed with natural cement and about five to fifteen per cent. as much alkali metal supersulfate energizing material.

4. The plaster composition comprising a large proportion of hydrated lime mixed with natural cement and alkali metal supersulfate energizing material.

5. The plaster composition comprising a large proportion of hydrated lime mixed with natural cement and supersulfate energizing material.

6. The plaster composition comprising a large proportion of available lime mixed with natural cement and energizing material comprising available sulfuric anhydrid loosely held in combination.

7. The plaster composition comprising a considerable proportion of available lime mixed with natural cement which has been ground together with about 5 to 15 per cent. of supersulfate energizing material.

8. The plastic composition comprising a considerable proportion of available lime mixed with natural cement and alkali metal supersulfate energizing material.

9. The plastic composition comprising a considerable proportion of available lime mixed with about ten to thirty per cent. of natural cement which has been ground together with supersulfate energizing material comprising available sulfuric anhydrid loosely held in combination.

10. The plastic composition comprising a considerable proportion of available lime mixed with about ten to thirty per cent. of natural cement and about five to fifteen per cent. as much coöperating supersulfate energizing material.

11. The plastic composition comprising a considerable proportion of available lime mixed with about ten to thirty per cent. of natural cement and about one-eighth as much coöperating energizing material comprising available sulfuric anhydrid loosely held in combination.

12. The plaster composition comprising a large proportion of available lime mixed with about 10 to thirty per cent. of natural cement and about one-eighth as much alkali metal supersulfate energizing material.

13. The plaster composition comprising a large proportion of hydrated lime mixed with natural cement and sodium disulfate energizing material.

14. The plaster composition comprising a large proportion of hydrated lime mixed with natural cement and about five to fifteen per cent. as much sodium disulfate energizing material.

15. The substantially dry composite strength accelerating material capable when incorporated therewith of improving working properties of hydrated lime plaster compositions and comprising natural cement which has been ground together with about 5 to 15 per cent. as much alkali metal supersulfate energizing material.

16. The composite strength accelerating material capable when incorporated therewith of improving working properties of hydrated lime plaster compositions and comprising natural cement mixed with sodium disulfate energizing material.

17. The composite strength accelerating material capable when incorporated therewith of improving working properties of hydrated lime plaster compositions and comprising natural cement mixed with about five to fifteen per cent. as much coöperating supersulfate energizing material comprising available sulfuric anhydrid loosely held in combination.

18. The substantially dry composite strength accelerating material capable when incorporated therewith of improving working properties of hydrated lime plaster compositions and comprising natural cement intimately mixed with a relatively small amount of sodium disulfate energizing material.

EDWARD L. CONWELL.

Witnesses:
BENJAMIN H. LUDLOW,
WILLIAM H. CREAMER, Jr.

Copies of this patent may be obtained for five cents each, by addressing the "Commissioner of Patents, Washington, D. C."